United States Patent
Olexa

(10) Patent No.: US 9,127,935 B2
(45) Date of Patent: Sep. 8, 2015

(54) LASER CENTERING TOOL FOR SURFACE AREAS

(71) Applicant: Chris Olexa, Fairfax, VA (US)

(72) Inventor: Chris Olexa, Fairfax, VA (US)

(*) Notice: Subject to any disclaimer, the term of this patent is extended or adjusted under 35 U.S.C. 154(b) by 378 days.

(21) Appl. No.: 13/734,739

(22) Filed: Jan. 4, 2013

(65) Prior Publication Data

US 2013/0167384 A1    Jul. 4, 2013

Related U.S. Application Data

(60) Provisional application No. 61/583,004, filed on Jan. 4, 2012.

(51) Int. Cl.
*G01B 11/14* (2006.01)
*G01C 15/00* (2006.01)

(52) U.S. Cl.
CPC ............. *G01B 11/14* (2013.01); *G01C 15/00* (2013.01); *G01C 15/004* (2013.01)

(58) Field of Classification Search
CPC ....... G01C 15/00; G01C 15/004; G01B 11/14
USPC ........... 33/227, 276–278, 281–286, 290–291, 33/DIG. 21; 356/614, 615; 250/559.35, 250/559.29
See application file for complete search history.

(56) References Cited

U.S. PATENT DOCUMENTS

| | | | | |
|---|---|---|---|---|
| 3,283,409 A | * | 11/1966 | Rothe et al. | 33/275 G |
| 3,471,234 A | * | 10/1969 | Studebaker | 356/3 |
| 3,604,119 A | * | 9/1971 | Inoue | 33/773 |
| 3,856,409 A | * | 12/1974 | Cindrich et al. | 356/138 |
| 3,897,637 A | * | 8/1975 | Genho | 33/227 |
| 4,035,084 A | * | 7/1977 | Ramsay | 356/139.08 |
| 4,606,639 A | * | 8/1986 | Mottier et al. | 356/497 |
| 5,218,770 A | * | 6/1993 | Toga | 33/276 |
| 5,606,802 A | * | 3/1997 | Ogawa | 33/276 |
| 5,784,155 A | * | 7/1998 | Ohtomo et al. | 356/141.1 |
| 5,907,907 A | * | 6/1999 | Ohtomo et al. | 33/291 |
| 5,909,311 A | * | 6/1999 | Ohtomo et al. | 359/489.07 |
| 6,073,353 A | * | 6/2000 | Ohtomo et al. | 33/290 |
| 6,314,651 B1 | * | 11/2001 | Ohtomo et al. | 33/290 |
| 6,401,349 B1 | * | 6/2002 | Onyon | 33/551 |
| 6,421,360 B1 | * | 7/2002 | Kousek et al. | 372/9 |
| 6,430,823 B1 | * | 8/2002 | Seki | 33/281 |
| 6,547,410 B1 | * | 4/2003 | Pederson | 362/35 |
| 6,568,094 B2 | * | 5/2003 | Wu | 33/281 |
| 6,705,745 B1 | * | 3/2004 | Pederson | 362/284 |
| 6,931,737 B1 | * | 8/2005 | Liao | 33/227 |
| 7,124,513 B2 | * | 10/2006 | Chen et al. | 33/286 |
| 7,411,661 B2 | * | 8/2008 | Kim | 356/4.01 |
| 7,434,322 B2 | * | 10/2008 | Walser et al. | 33/286 |
| 7,520,064 B2 | * | 4/2009 | Hayase et al. | 33/290 |
| 7,797,846 B2 | * | 9/2010 | Walser | 33/290 |

(Continued)

*Primary Examiner* — R. A. Smith
*Assistant Examiner* — Tania Courson
(74) *Attorney, Agent, or Firm* — Attentive Law; Paul Ratcliffe

(57) ABSTRACT

A laser centering tool for surface areas used to find the center point of a surface. The laser centering tool uses single or multiple laser sources to project a plurality of lines on a horizontal or vertical surface. It may comprise of multiple lasers, rotational plates, prism, beam splitter, gear housing, and/or a gear mechanism. At least one center laser line remains stationary between at least two edge laser lines. The edge lasers may be moved to outline the edge of a surface. At least one center laser projects a beam that indicates the center point of the edge lasers. The edge laser lines may be moved by rotational plates, a set of mirrors, or prism.

24 Claims, 12 Drawing Sheets

(56) References Cited

U.S. PATENT DOCUMENTS

| | | | |
|---|---|---|---|
| 7,979,993 B2* | 7/2011 | Tippett et al. | 33/228 |
| 7,992,310 B2* | 8/2011 | Litvin et al. | 33/286 |
| 8,365,424 B2* | 2/2013 | Laabs et al. | 33/281 |
| 8,869,411 B2* | 10/2014 | Lukic et al. | 33/228 |
| 2003/0009891 A1* | 1/2003 | Ohtomo et al. | 33/286 |
| 2004/0246498 A1* | 12/2004 | Kumagai et al. | 356/614 |
| 2006/0196059 A1* | 9/2006 | Berto | 33/286 |
| 2007/0071430 A1* | 3/2007 | Iwanaga | 396/114 |
| 2012/0216413 A1* | 8/2012 | Adegawa | 33/290 |
| 2013/0174432 A1* | 7/2013 | Kumagai et al. | 33/286 |

* cited by examiner

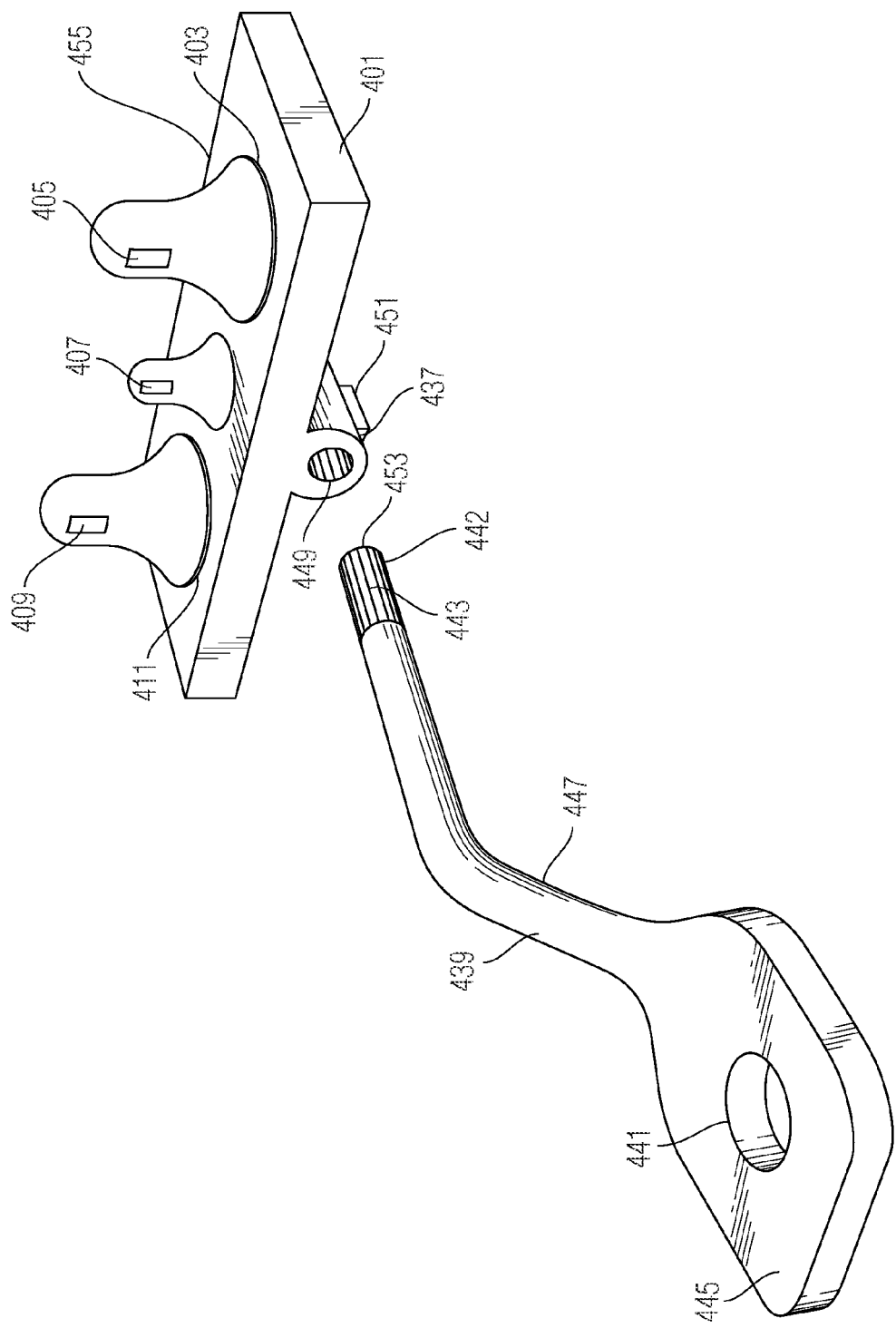

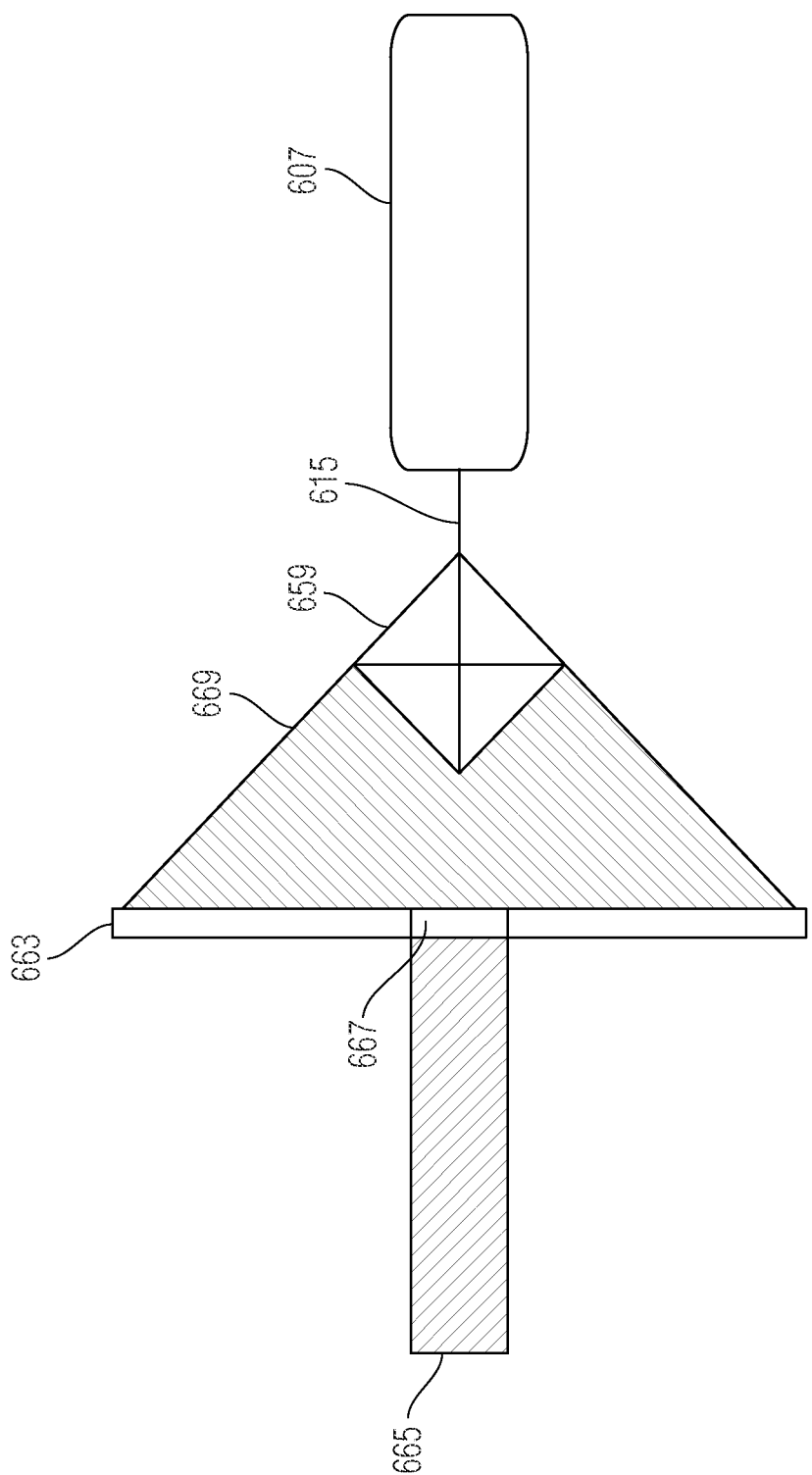

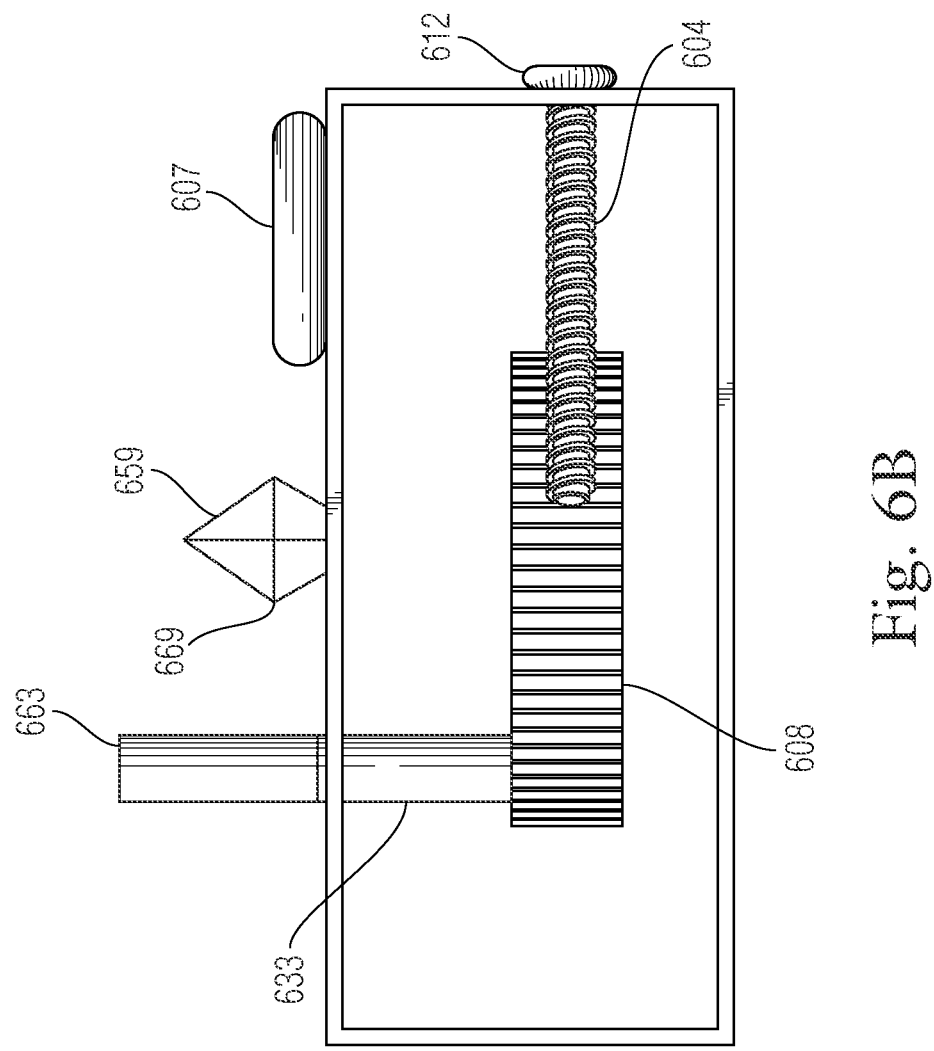

LASER CENTERING TOOL FOR SURFACE AREAS

RELATED APPLICATION

This application claims priority to U.S. Provisional Patent Application 61/583,004 filed on Jan. 4, 2012, entitled "Laser Centering Tool", the entirety of which is incorporated herein.

BACKGROUND OF THE INVENTION

1. Field of the Invention

The present invention relates to a laser centering tool for surface areas. More specifically, the invention relates to a tool to find the centerline of surfaces.

2. Description of the Related Art

Unlike normal light, laser light is directional and has a very tight, strong, and concentrated beam. As a result, laser lights have been utilized in numerous tools, particularly in construction and household tools.

One popular application is utilizing the laser as an alternative to the traditional metal tape measures. Laser tape measures are used by contractors, architects, flooring professionals, and homeowners to calculate the lengths, widths, and heights of an area. A laser tape measure is used in a similar manner as a traditional metal tape measure. To use a laser tape measure, a user places the device at one end of the area to be measured, and aims the device at an object at the other end of the area. The object may be a wall, pole, or any other target that will allow the beam to reflect off of it. Often times a laser tape measure calculates the distance of an area by either the phase-shift method or time-of-flight method. Using the phase-shift method, the laser tape measure compares the beam reflections that it sends. Using the time-of-flight method, the laser tape measuring device calculates the amount of time it takes for an optical pulse to reflect back to the device.

Another popular use of the laser is the laser leveling devices. One type of laser leveling device is the dot laser. A dot laser level is an inexpensive tool that projects a point or dot which can be leveled using a spirit or bubble level.

A more expensive and versatile laser leveling device is the line laser. Line laser leveling devices are often used by homeowners to hang a series of framed pictures, mirrors, or other decorations on a wall. The line laser leveling device projects a perfectly straight beam horizontally or vertically across a surface. The line laser leveling device is placed parallel to the surface, such as a wall, and may be either mounted directly onto the surface or placed on a tripod. To ensure the projected beam is leveled, the line laser leveling device often includes a spirit or bubble level. The line laser leveling device is typically designed for indoor use, and has a limited distance that the beam may be projected across.

A third type of laser leveling device is the rotary laser, which is often used by contractors to lay pipes, foundation, or grade roads. A rotary laser leveling device is rotated 360 degrees while projecting a dot to create a horizontal plane. Unlike the line laser leveling device, rotary lasers are more expensive and may project a beam over a longer distance. The rotary laser leveling devices are often leveled using a spirit or bubble level.

Because current household and contractor tools that utilize lasers do not allow for the user to easily find the center of a surface, there is a need for a device that utilizes lasers in a centering tool. Such laser centering tool may be used for assisting a homeowner hang picture frames in equal distances to each other or assembling a door knob onto a kitchen cabinet.

SUMMARY OF THE INVENTION

This summary is provided to introduce concepts in a simplified form that are further described in the detailed description of the invention. This summary is not intended to identify key or essential inventive concepts of the claimed subject.

The present invention provides for a laser centering tool for surface areas that uses single or multiple laser sources to project a plurality of lines on a horizontal or vertical surface. In the primary embodiment, the center laser line is fixed and two additional laser lines act as edge lasers. The two edge lasers may move in identical relation to each other. The center laser indicates the center point between the two edge lasers which allows a user to find the center of any surface.

The present further provides a device comprised of a housing; a center light source mated to the housing configured to generate a center reference light line projected onto a surface; a left light source configured to generate a left reference light line projected onto the surface wherein the left light source is connected to a left rotational element; a right light source configured to generate a right reference light line projected onto the surface wherein the right light source is connected to a right rotational element; a power source for providing power to the center light source, left light source, and right light source; a gear system within the housing which controls the rotation of the left rotation element and right rotational element configured to move the left rotational element and right rotational element in unison and in opposite rotational directions; and wherein the movement of the left rotational element and right rotational element cause the left reference light line and the right reference light line to move in equal increments away from or towards the center reference light line. The devise may also include a sensor for receiving a reflected light signal from the center light source, wherein the reflected light signal can be used to determine the distance from the device to the reflecting surface. The device can also use the determined distance in combination with the degree of rotation of at least one of the rotational elements to determine the distance between the center reference light line and the left reference light line or the right reference light line. The device could include a left sensor for receiving a reflected light signal from the left light source and a right sensor for receiving a reflected light signal from the right light source, wherein the left and right reflected light signals can be used to determine a left side distance and a right side distance of the respective light from the reflecting surface. The device can notify the user when the left side distance and right side distance are equal indicative of the device being parallel to the surface. The device can be configured with a mounting element for mounting to a stand and can include an adjustment dial for the user to adjust the angular rotation of the left rotational plate and right rotational plate. The device may also include a display for displaying the determined or calculated distances.

The present invention also provides a device comprising: a housing; a center light source mated to the housing configured to generate a center light beam; a power source for providing power to the center light source; at least one beam splitter for splitting the center light source into a center beam, a left beam and a right beam, wherein the center beam projects a center reference light line onto a surface; a left mirror configured to reflect the left beam producing a left reference light line on the surface wherein the left mirror is connected to a left rotational element; a right mirror configured to reflect the right beam producing a right reference light line on the surface wherein the right mirror is connected to a right rotational element; a gear system within the housing which controls the rotation of the left rotation element and right rotational element and is configured to move the left rotational element and right rotational element in unison and in opposite rotational directions; and wherein the movement of the left rotational element and right rotational element cause the left reference light line and the right reference light line to move in equal increments away from or towards the center reference light line. The device may further include a sensor for receiving a reflected light signal from the center light source, wherein the reflected light signal can be used to determine the distance from the device to the reflecting surface. Further, the device can use the determined distance in combination with the degree of rotation of at least one of the rotational elements to determine the distance between the center reference light line and the left reference light line or right reference light line. The device could include a left sensor for receiving a reflected light signal from the left beam and a right sensor for receiving a reflected light signal from the right beam, wherein the left and right reflected light signals can be used to determine a left side distance and a right side distance of the respective light from the reflecting surface. The system can notify the user when the left side distance and right side distance are equal indicative of the device being parallel to the surface. The device has a mounting element for mounting to a stand and may include an adjustment dial for the user to adjust the angular rotation of the left rotational plate and right rotational plate. The device may also include a display for displaying one or more determined distances.

The device of the present invention may also comprise: a housing; a center light source mated to the housing configured to generate a center light beam; a power source for providing power to the center light source; at least one beam splitter for splitting the center light source into a center beam, a left beam and a right beam, wherein at least one of the at least one beam splitter is mounted to a moveable plate and wherein the center beam projects a center reference light line onto a surface; a left mirror configured to reflect the left beam producing a left reference light line on the surface; a right mirror configured to reflect the right beam producing a right reference light line on the surface; a mechanism within the housing which controls the movement of the moveable plate so that the left beam and right beam reflect off of the left mirror and right mirror respectively at different locations on the mirrors; and wherein the movement of the moveable plate causes the left reference light line and the right reference light line to move in equal increments away from or towards the center reference light line. The device may further include a sensor for receiving a reflected light signal from the center light source, wherein the reflected light signal can be used to determine the distance from the device to the reflecting surface. The device may use the determined distance in combination with the displacement of the moveable plate to determine the distance between the center reference light line and the left reference light line or right reference light line. The device may also include a left sensor for receiving a reflected light signal from the left beam and a right sensor for receiving a reflected light signal from the right beam, wherein the left and right reflected light signals can be used to determine a left side distance and a right side distance of the respective light from the reflecting surface. The system can notify the user when the left side distance and right side distance are equal indicative of the device being parallel to the surface. The device may include a mounting element for mounting to a stand. The device may include an adjustment dial for the user to adjust the movement of the moveable plate. The device may also include a display of claim for displaying one or more determined distances.

These and other objects, features, and/or advantages may accrue from various aspects of embodiments of the present invention, as described in more detail below.

BRIEF DESCRIPTION OF THE DRAWINGS

The foregoing summary, as well as the following detailed description of the invention, is better understood when read in conjunction with the appended drawing. For the purpose of illustrating the invention, exemplary constructions of the invention are shown in the drawings. However, the invention is not limited to the specific methods and instrumentalities disclosed herein.

FIG. 4 illustrates the mounting plate including the tripod plate and S-curve.

FIG. 6A illustrates the present invention including a single laser, a prism, and shaded lens.

FIG. 6B illustrates the cross-sectional side view of a first embodiment of the gear mechanism of the present invention.

DETAILED DESCRIPTION OF EXEMPLARY EMBODIMENTS

Figure 1:
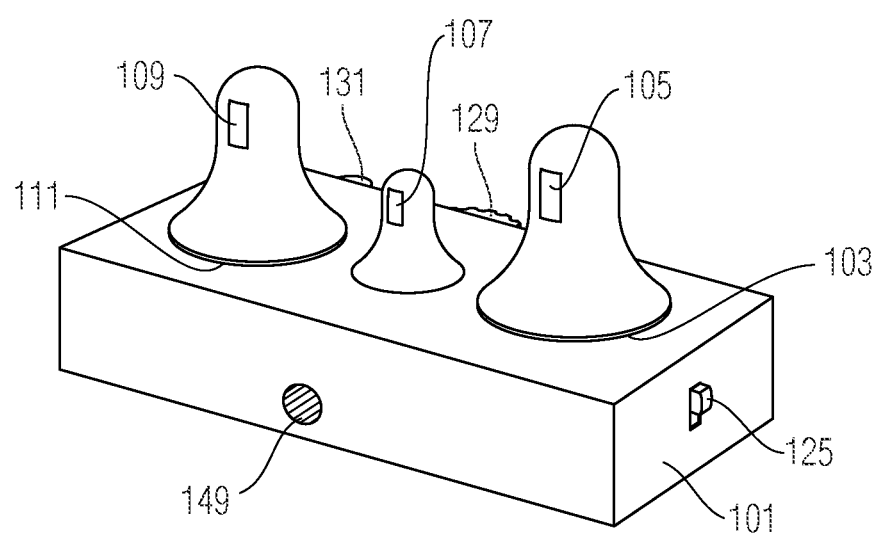
FIG. 1 illustrates the perspective view of the present invention, including a center laser line, two edge laser lines, and the gear housing.

Particular embodiments of the present invention will now be described in greater detail with reference to the figures.

In the first embodiment, the present invention consists of a housing base 101, two rotational plates 111, 103, three lasers 109, 107, 105, an on/off switch 125, and a cylindrical tube 149. The housing base 101 houses the gear mechanism, power source, and wires. Two rotational plates 111, 103 are affixed to the top of the housing base 101. Two turrets 119, 121, each housing one of two lasers 105, 109 are attached to the rotational plates 103, 111 so that the lasers may rotate 360 degrees. Alternatively, the rotational plates 103, 111 may be designed such that they, and the mounted lasers, do not rotate a full 360 degrees to avoid creating problems with wiring to the lasers. The third laser 107 is placed in a center turret on top of the housing base 101 and remains stationary. Alternatively, this third laser 107 may be placed inside and in the center of the housing base 101.

The lasers 105, 107, 109, are attached to a power source such as a battery, and an on/off switch 125 by electrical wires. The wiring may be visible or housed within the turrets 119, 121 and housing base 101.

When the present invention is turned on via the on/off switch 125, the lasers 105, 107, 109 emit perpendicular laser lines that can be seen on any hard surface, i.e., a wall. These lines may become horizontal lines by turning the present invention clockwise or counter-clockwise as described further below.

The two rotational plates 111, 103 may rotate the two turret lasers 109, 105 in an identical relation to each other so that the distance between the left laser line emitted from the left laser 109 and the center laser line emitted from the center laser 107 is equal to the distance between the right laser line emitted from the right laser 105 and the center laser line emitted from the center laser 107. Therefore, the center laser line is always the exact center point between the left laser line and right laser line. The rotational plates 111, 103 may rotate the two turret lasers 109, 105 up to 360 degrees. In addition, the rotational plates 111, 103 rotate in opposite direction to each other. For example, as the left rotational plate 111 moves the left laser 109 clockwise 15 degrees, the right rotational plate 103 moves the right laser 105 counter clockwise 15 degrees.

The rotational plates 103, 111 are attached to a gear mechanism 319, 321, 323, 325 located in the gear housing 301 (seen in FIG. 3). This gear mechanism 319, 321, 323, 325 is used to rotate the rotational plates 103, 111 and two turret lasers 105, 109. The user may utilize a center adjustment dial 129 and a spring-loaded knob 131 connected to the gear mechanism 319, 321, 323, 325 to rotate the two rotational plates 103, 111 in an identical relation to each other. The center adjustment dial 129 may also allow for both fine and coarse adjustments. The gear mechanism 319, 321, 323, 325 is further described in FIGS. 2 and 3.

In one embodiment, the present invention may not have turrets 119, 121. For example, the right and left lasers 105, 109 could be housed not in protruding turrets 119, 121 but rather inside the housing base 101 attached to internal rotational plates 103, 111. In this example, the front housing base 101 would be made out of translucent material, like plastic or glass, that allows for the laser lines to be visibly emitted.

Figure 2:
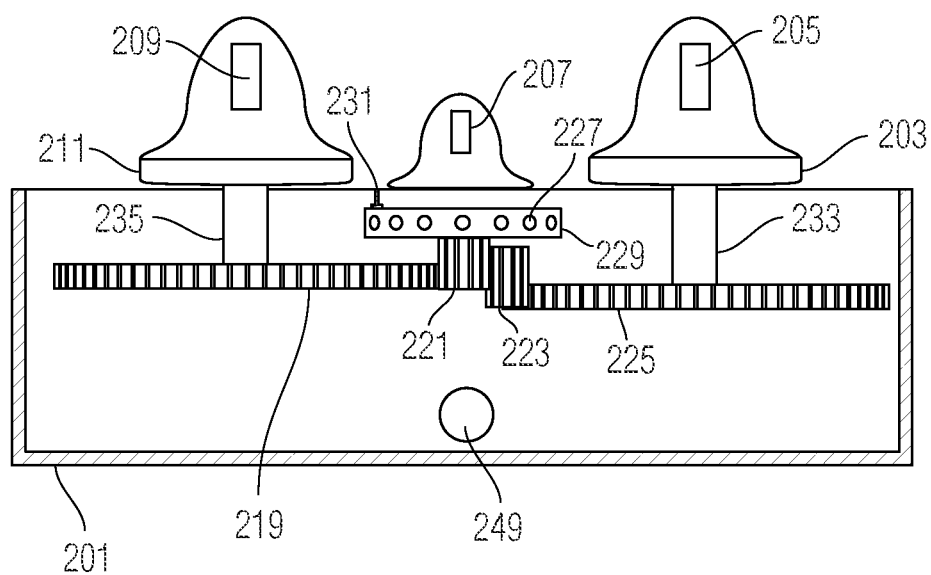
FIG. 2 illustrates the cross-sectional side view of the present invention, including the gear housing, center laser line, two edge laser lines, and the gear mechanism.

FIG. 2 depicts a cross-sectional side view of an embodiment of the present invention including the gear mechanisms 219, 221, 223, 225, the rotational plates 211, 203, the multiple lasers 209, 207, 205, the center adjustment dial 229, and the spring-loaded knob 231. A center adjustment dial 229 is used to rotate the rotational plates 211, 203 in an identical relation to each other.

The center adjustment dial 229 is connected to a center gear 221. Directly to the left of the center gear 221 is the left gear 219. The left gear 219 is aligned with the center gear 221, but positioned slightly below the center adjustment dial 229. The left rotational plate 211 is connected with the left gear 219. In one embodiment, a column 235 may be used to connect the left rotational plate 211 with the left gear 219. By way of example, as a user rotates the center adjustment dial 229 counterclockwise, the left gear 219 rotates clockwise which also rotates the left rotational plate 211 and left laser 209 in a clockwise direction.

A small gear 223 is positioned directly on the bottom right corner of the center gear 221. The small gear 223 is positioned adjacent to the center gear 221 and the right gear 225. The right gear 225 is on a lower horizontal plane than the center gear 221 and does not engage the center gear directly. Placing the right gear 225 lower than the main gear 221 allows the left gear 219 and the right gear 225 to be equidistant from the center point of the main gear 219. The small gear 221 enables the left gear 219 and right gear 225 to rotate in opposite directions and in identical relation to each other. Columns 235, 233 connect the left and right gears 219, 225 to the left and right turrets 211, 203 for the left and right lasers 209, 205. As a user rotates the center adjustment dial 229 counterclockwise, the small gear 223 rotates clockwise and the right gear 225 moves counterclockwise. This causes the right rotational plate 203 and right laser 205 to also move counterclockwise. At the same time, the left gear 219, left rotation plate 211, and left laser 209 rotate in a clockwise direction.

In order to allow for coarse and fine adjustment, a spring-loaded knob 231 is positioned between the top of the gear housing 201 and the center adjustment dial 229 to allow for gradual adjustments. The graduated scale would be relative to the zero point and could employ a clamping or friction fit to adjust and hold the set adjustment. Indicia or labels are placed on the center adjustment dial 229 to identify the number of degrees the rotational plates 211, 203 are rotated.

In the alternative, slight pressure molds or indentions line the top of the center adjustment dial 229 to allow for the rotational plates to be rotated in preset increments. These indentions correlate with the required distance the center adjustment dial 229 must move to rotate the rotational plates 211, 203 a certain number of degrees. Labels are placed on the center adjustment dial 229 to identify the number of degrees the rotational plates 211, 203 are rotated for every indention. The spring-loaded knob 231 fits within the slight pressure molds. As a user rotates the center adjustment dial 229, the spring-loaded knob 231 slides across the surface of the center adjustment dial 229 and into the various pressure molds that line the top of the center adjustment dial 229. When the spring-loaded knob 231 slides into a pressure mold, it holds the center adjustment dial 229 into place until the user continues rotating the center adjustment dial 229. In addition, ridges 227 are indented on the side of the center adjustment dial 229 for finger traction.

By way of example, for every 15 degrees the rotational plates 203, 211 rotate, a pressure mold is placed on the center adjustment dial 229. This allows the user to adjust the center adjustment dial 299 in 15 degree increments. Thus, the two edge lasers 205, 209 may be moved by a 0°, 15°, 30°, 45°, 60°, or 90° rotation. It should be noted that the center adjustment dial 229 would not be limited to preset 15 degree incremental adjustments, and the 15 degree incremental adjustments are for the purpose of this example.

Continuing with the above example, a user determines he wants to find the center point of his wall. The user places the present invention in front of the wall so that the light lines from the three lasers 205, 207, 209 are projected on the wall. The user utilizes the center adjustment dial 229 to rotate the rotational plates 211, 203 in any degree increments or to the 15 degree preset increments. At each 15 degree increment, the spring-loaded knob 231 holds the center adjustment dial 229 into place. This allows the user to make fine adjustments. In order to continue rotating the lasers 209, 205, the user must exert slight additional force to rotate the center adjustment dial 229 to the next 15 degree increment. The user continues to rotate the center adjustment dial 229 until the laser line of the left laser 105 meets the left edge of the wall and the laser line of the right laser 109 meets the right edge of the wall. At this point, the line from the center laser 107 is positioned at the center of the wall. Again, it should be noted that the center adjustment dial 229 would neither be limited to the preset 15 degree incremental adjustments nor limited to any preset increments, and the 15 degree incremental adjustments are for the purpose of this example.

In addition, a cylindrical tube 249 is positioned at the bottom of the housing base 201. Within the cylindrical tube 249 are linear grooves which are part of the mounting mechanism. This mounting mechanism will be further described in FIG. 4.

Figure 3A:
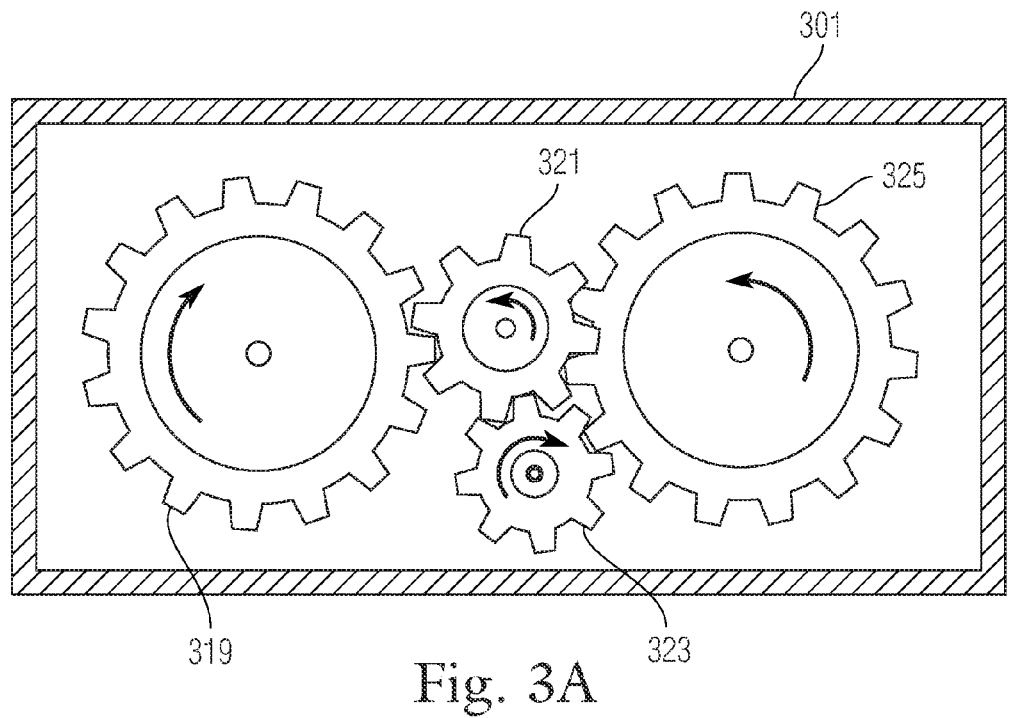
FIG. 3A illustrates the cross-sectional top view of a first embodiment of the gear mechanism of the present invention.

FIG. 3A depicts the top view of a first embodiment of the gear mechanism, including the gear housing 301, the left gear 319, the center gear 321, the small gear 323, and the right gear 325. The small gear 323 is positioned adjacent to the center gear 321 and the right gear 325. The right gear 325 is on a lower horizontal plan and does not contact the main gear 321. This design enables the left gear 319 and right gear 325 to be equidistant from the center point of the main gear 321 which may be used as a guide for placement of the center laser 207 (FIG. 2). The right gear 325 and left gear 319 may be identical in shape and size. As discussed above, the left gear 319 and right gear 325 move in opposite and identical relation to each other. As the center gear 321 is rotated counterclockwise, the left gear 319 rotates clockwise and the right gear 325 rotates counterclockwise. This causes the left rotation plate 211 and left laser 209 to move clockwise, and the right rotation plate 203 and right laser 205 to move counterclockwise.

Figure 3B:
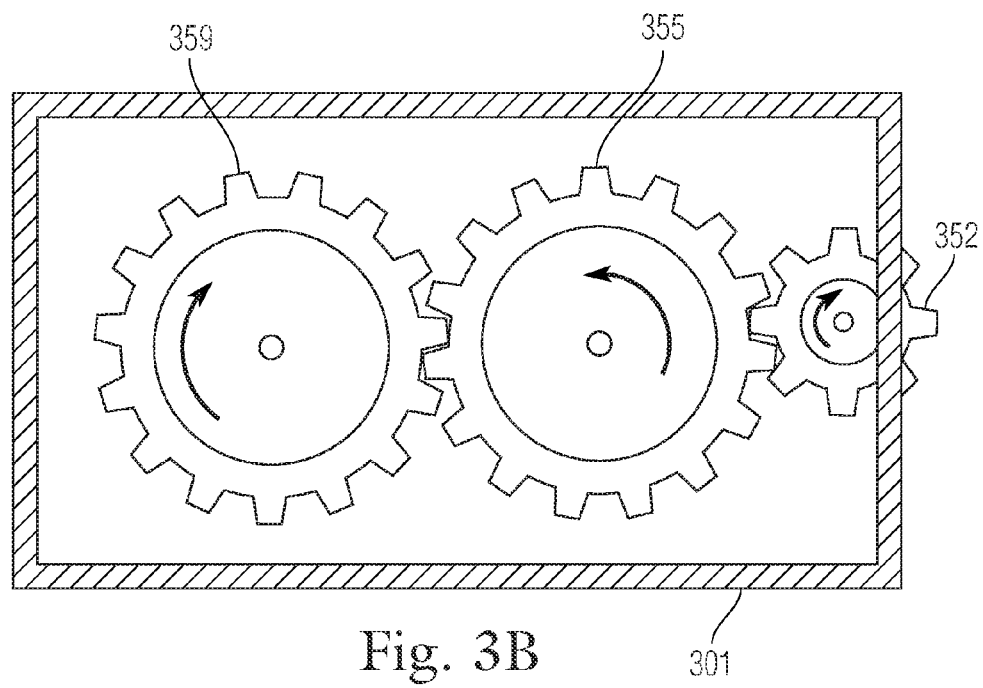
FIG. 3B illustrates the cross-sectional top view of a second embodiment of the gear mechanism of the present invention.

FIG. 3B depicts a second embodiment of the gearing mechanism which provides a left gear 359, a right gear 355, and an adjustment dial or gear 352. The adjustment dial 352 is geared to mate with the right gear 355. The right gear 355 is geared to also mate with the left gear 359 such that when the adjustment dial 352 is rotated the right gear 355 and left gear 359 move in opposite directions in identical relation to each other. The left and right lasers may be attached to the left and right gears 359, 355 and the center laser may be positioned at the intersection of the left and right gears 359, 355.

Although the present invention is depicted using a gear based mechanism or design, other drive systems may be used to rotate the left and right lasers. Such other drive systems may include belts, chains, wires, pulleys or manually rotated designs.

A lens with a reticule may also be fixed onto the center laser 107 for perpendicular reference. The lens may also be adjusted so that the reticule may be a moveable perpendicular reference.

In an additional embodiment, one or more sensors may be added to the present invention and used to measure distance. The sensors would be located near one of the lasers 105, 107, 109 to receive a reflected light signal as the light reflects off of the surface the light is projected upon. The sensors can be connected to a processor which can identify the speed within which the reflected signal was received by the sensor and therefore, determine the distance of the device from the reflecting surface. The sensors could be standard laser or light sensors which can receive reflected signals in any range but most likely in the 24 to 700 nanometer range. The sensors could be laser range finders or proximity sensors which determine distance based upon the change in energy or a change in the directed beam or field where the change in energy, beam, or field can be associated with distance.

Using the distance of the device to the wall or reflecting surface and knowing the angle of rotation of the left and right lasers 105, 109, the system or device can calculate the distance from the center laser line 515 (see FIG. 5) to the left or right laser line 513, 517. Using standard trigonometric equations and assuming a 90 degree right angle of the center laser to the surface, the space or distance between the center line and the left or right laser line can be calculated as the tangent of the angular displacement times the distance of the unit to the surface (or wall). The system might use other known calculations and theorems to determine the various sides or angles of a triangle. The calculations are handled or processed by the processor and can then be displayed on a user display integrated in the device. The distance sensors could also be used in conjunction with the left and right lasers 105, 109 to determine the distance of the left and right sides of the housing 101. The use of left and right sensors would be useful in verifying that the housing 101 is placed parallel to the reflecting surface to insure the center beam is perpendicular to the reflecting surface. Therefore, distance calculations of the distance between outer laser lines 513, 517 (see FIG. 5) and the center laser line 515 which utilize the rotational angle of the rotating plates are more accurate since they are likely premised on a right angle or 90 degree equation.

In a preferred embodiment, angular displacement is determined through the use of one or more sensors. The system can utilize angular position sensors such as rotary encoders, magnetic displacement sensors, fiber optic sensors, linear displacement sensors, angular displacement transducers, rotary variable differential transformers, and other similar sensors that can be used to determine the angle of the laser 105, 107 from the unit or housing 101.

In an additional embodiment, the main housing 401 may be attached to a mounting plate 439 as depicted in FIG. 4. The mounting plate 439 allows for the main housing 401 to be rotated on an axis in both a clockwise and counterclockwise direction. The mounting plate 439 includes a flat tripod plate 445, an S-curve 447, and a mating stem 442 for mounting the main housing 401 onto the mounting plate 439.

One end of the S-curve is connected to the flat tripod plate 445. In the center of the flat tripod plate 445 is a hole 441. The hole 441 on the tripod plate 445 allows for the mounting plate 439 to be placed and secured to the head of most commercial tripods.

The S-curve 447 has a mating stem 442 on the opposite end of the tripod plate 445. The mating stem 442 is cylindrical in shape with linear grooves 443. A cylindrical tube 437 is integrated or connected to the bottom of the main housing 401. The main housing 401 attaches to the mounting plate 439 by sliding the cylindrical tube 437 onto the mating stem 442. Linear grooves 449 are found within the cylindrical tube 437. These linear grooves 449 are complementary to the linear grooves 443 found on the mating stem 442 so that the main housing 401 may be securely locked into place.

A spring loaded mechanism may be used to lock and unlock the housing 401 from the linear grooves 443, 449 by expanding the tube 437 or retracting the grooves 449. This allows for the main housing 401 to be rotated around the mating stem 442, and be set and used at different angles. The spring loaded mechanism or design may be comprised of a spring, knob locking component, and knurled knob. As the user pulls out the knurled knob, the knob locking component disengages which allows for the housing 401 to be rotated around the mating stem 442 and secured at different angles without having to remove the main housing 401 completely off the mating stem 442. In one embodiment, the linear grooves 449 are preset such that the main housing 401 can only be rotated based on the distance between the grooves 449.

Figure 7:
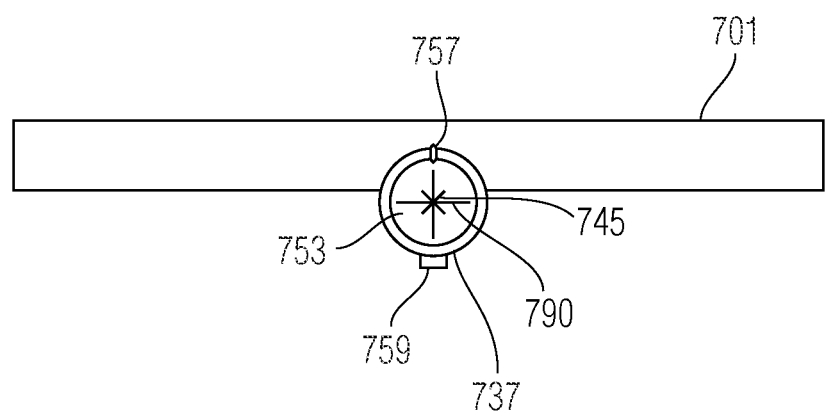
FIG. 7 illustrates the graduated scale of the mounting mechanism of the present invention.

As an alternative, the rotation of the main housing 401 would not be dependent on the linear grooves 443, 449. The main housing 401 attaches to the mounting plate 438 by sliding the mating stem 442 into the cylindrical tube 437. A frictional press 759 (as seen in FIG. 7), such as a clamp with a gripped inner surface or a screw based clamp, would push down on the mating stem 442 to hold the main housing 401 into place. The frictional press may be released so that the user can rotate the main housing 401 around the stem 442 at any angle. The frictional press may be tightened to the main housing 40 at the desired angle. In this alternative embodiment, the cylindrical tube 437 and mating stem 442 may or may not have linear grooves 443, 449.

A graduated scale 453 is placed at the cylindrical end of the stem 442. When the stem 442 is placed in the cylindrical tube 437, the graduated scale 453 is visible through an opening 455 on the cylindrical tube 437 of the main housing 401. As depicted in FIG. 7, a graduated scale 753 is placed at the cylindrical end of the S-curve. The graduated scale 753 indicates various angles. For example, the graduated scale 753 may indicate degree marks such as forty-five 745, and ninety 790 degree marks. As an alternative example, the graduated scale 753 may indicate a −90, −60, −45, −30, −15, 0, 15, 30, 45, 60 and 90 degree marks. A zero mark 757 is located on the end of the cylindrical tube 737 on the gear housing 701. The gradual scale 753 is relative to the zero mark 757.

An example of the present invention in use is provided, wherein a user wants to hang a series of three pictures, Picture A, Picture B, and Picture C, on his wall. He wants to hang the pictures in a "V" alignment. The user places the gear housing 401 onto the mounting plate 439 by sliding the cylindrical end of the S-curve 447 into the cylindrical tube 437 located on the main housing 401. Using the spring mechanism, the user locks the main housing 401 into place so that it is parallel with the floor. In order to ensure the main housing 401 is parallel to the floor, the user adjusts the main housing 401 using the graduated scale 753 so that the zero mark 757 and 0° on the cylindrical tube 437 are aligned. The user then secures the mounting plate 439 and the main housing 401 combination onto a commercial tripod, and positions the tripod some distance from the wall. For purpose of this example, the user positions the tripod approximately 4 feet from the wall. Using the center adjustment dial 429, the user rotates the laser, 405 409 until the left laser line 513 (see FIG. 5) and right laser line 517 are approximately 2 feet apart from the center laser line 515. The user mounts Picture B where the center laser line 515 meets the wall.

The user unlocks the main housing 401 from the mating stem 442, and rotates the main housing 401 45 degrees counterclockwise so that the right laser 405 is positioned higher than the left laser 409. The user locks the main housing 401 into place on the stem 442. Without adjusting the center adjustment dial 429, the user mounts Picture A where the line from the right laser 109 meets the wall.

The user unlocks the main housing 401 from the mating stem 442 and rotates the main housing 401 90 degrees clockwise from its current position (45 degrees clockwise from zero) so that the left laser 409 is positioned higher than the left laser 409. The user locks the gear housing 401 into place on the stem 442. Without adjusting the center adjustment dial 429, the user mounts Picture C where the left laser mark meets the wall. Using the present invention, the user was able to hang the three pictures, Picture A, Picture B, and Picture C, in a "V" alignment on the wall.

In addition, as depicted in FIG. 4, a fine adjustment tool 451 is located under the cylindrical tube 437 of the main housing 401. The fine adjustment tool 451 moves the main housing 401 toward and away from the mounting plate 445. This allows for slight adjustments between the distance of the laser lines (see FIG. 5) 513, 515, 517, and the wall.

In an alternative embodiment, an adapter may be used to allow the main housing 401 to be attached to the stem 442 in a vertical orientation. A vertical orientation would project the laser lines perpendicular to the mounting plate 445 such that a user may use the present invention to find the center of the ceiling or floor. The adapter, not pictured, has a cylindrical tube similar to the cylindrical tube 437 found on the main housing 401 such that it may be secured onto the mating stem 442 of the mounting plate 439. The cylindrical tube of the adapter slides onto the mating stem 442 of the S-curve 447. The adapter may be secured on the mating stem 442 by complementary linear grooves and a spring loaded mechanism, as described above, or a friction press, such as a clamp with a gripped inner surface or a screw based clamp. The adapter may be designed in either an "L" or "T" shape such that it has an opening on one end for mating to the stem 442 and a perpendicular stem for the main housing 401. The main housing 401 is secured onto the perpendicular stem by sliding the cylindrical tube 437 onto the perpendicular stem. Similar to the securing mechanism described in FIG. 4, the main housing 401 may be secured onto the perpendicular stem by complementary linear grooves and a spring loaded mechanism or a friction press, such as a clamp with a gripped inner surface or a screw based clamp. The adapter may be rotated around the mating stem 442. A graduated scale 453, similar to described in FIG. 7, may be used to indicate various angles the adapter is rotated. Alternatively, the main housing 401 may be configured to have an integrated adapter or a second opening perpendicular to the cylindrical rube 437.

Figure 5A:
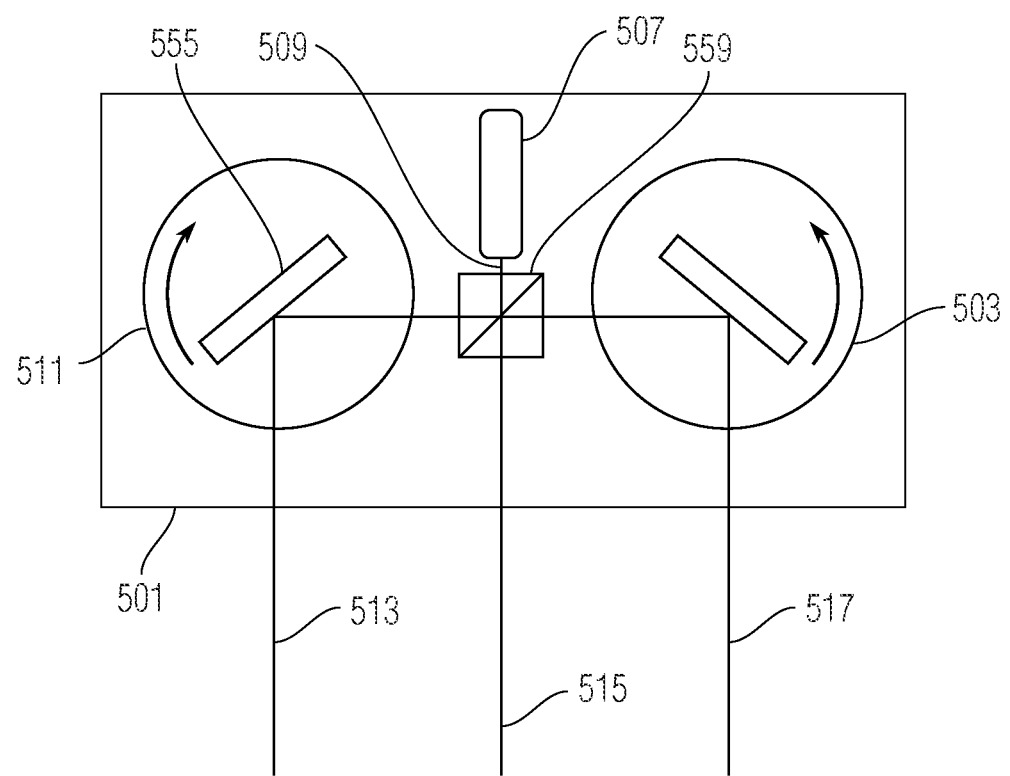
FIG. 5A illustrates the present invention including a single laser, system of mirrors, a center laser line, two edge laser lines, gear housing, and a gear mechanism.
Figure 5B:
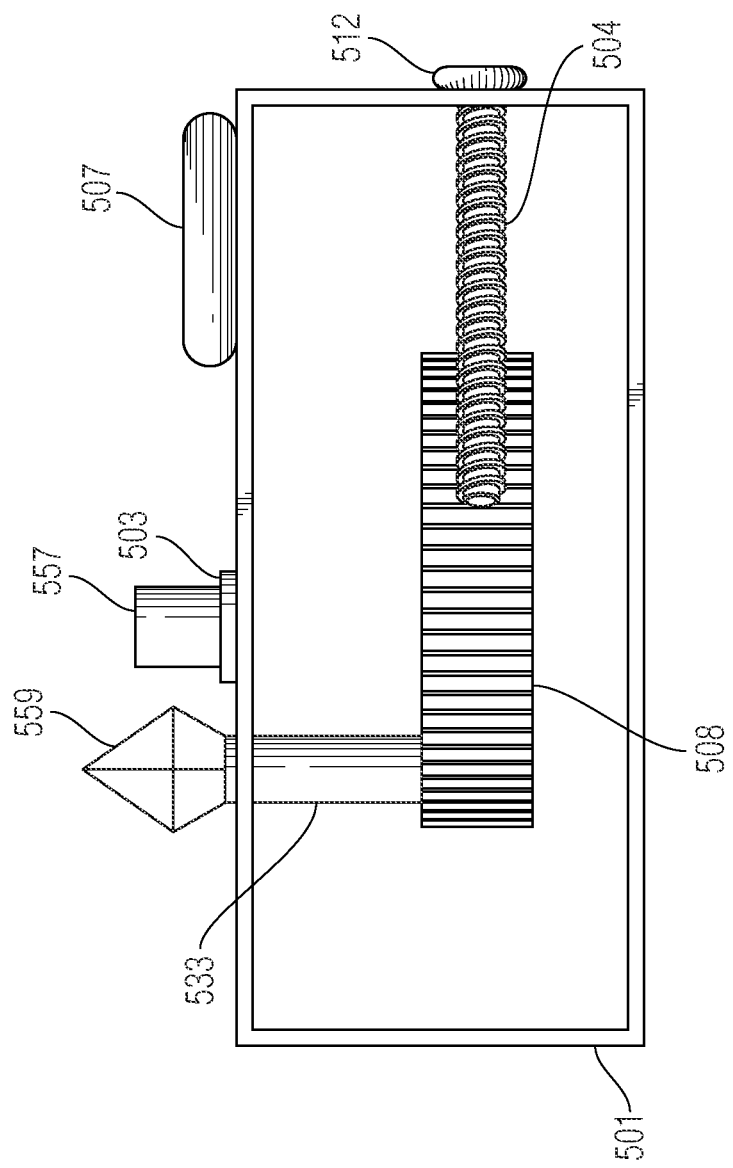
FIG. 5B illustrates the cross-sectional side view of a first embodiment of the gear mechanism of the present invention.

In another embodiment of the present invention as depicted in FIGS. 5A and 5B, the present invention consists of a single laser 507, a gear mechanism like those depicted in FIG. 3A or 3B, housing 501, at least one beam splitter 559, mirrors 555, 557, and two rotational plates 511, 503. Similar to FIG. 1, a center laser 507 remains stationary in the center of the gear housing. A single laser line 509 is projected from the center laser 507 through a beam splitter 559 that splits the single laser line 509 into three laser lines: a left laser line 513, a right laser line 517, and a center laser line 515. The beam splitter 559 may consist of a single beam splitter or multiple beam splitters arranged in front of each other. The single laser line 561 is split so that the left and right laser lines 513, 517 are perpendicular to the third center laser line 515.

A set of two mirrors 555, 557 are used to reflect left laser line 513 and right laser line 517 so that the right laser line 517 and left laser line 513 are projected in the same direction as the center laser line 515. The left mirror 555 is positioned to the left of the beam splitter 559 on a left rotational plate 511. A second mirror 557 is positioned to the right of the beam splitter 559 on a right rotational plate 503. The left mirror 555 and right mirror 557 are aligned directly across each other, and are positioned in opposite angles. The mirrors 557, 555 are also moved in identical relation to each other by a gear mechanism (see FIGS. 3A and 3B).

As previously discussed and as seen in FIG. 3A, the gear mechanism consists of a left gear 319, center gear 321, small gear 323, and right gear 325 which are located inside the gear housing 501. The left gear 319 is aligned to the left of the center gear 321. A small gear 323 is positioned directly toward the bottom right corner of the center gear 321. The small gear 321 allows the left gear 319 and the right gear 325 to rotate in opposite directions and in identical relation to each other. Similar to the rotation of the lasers in FIG. 1, as the right gear 325 rotates counterclockwise, the right rotational plate 503 and mirror 555 rotate counterclockwise. As the left gear 319 rotate clockwise, the left rotation plate 511 and mirror 555 rotate clockwise.

The mirrors 555, 557 are used to move the left laser line 513 and right laser line 517 in an identical relation to each other. Therefore, the distance between the left laser line 513 and the center laser line 515 is equal to the distance between the right laser line 517 and the center laser line 515. In addition, the center laser line 515 is always the exact center point between the left laser line 513 and right laser line 517.

By way of example, the user rotates the center gear 321 counterclockwise using the center adjustment dial 229 as described in FIGS. 2 and 3. This causes the right gear 325 to rotate counterclockwise, and the left gear 319 to rotate clockwise. As the right gear 325 rotates counterclockwise, the right rotational plate 503 rotates counterclockwise causing the right mirror 557 to move the right laser line 517 outward. Similarly, as the left gear 319 rotates clockwise, the left rotational plate 511 rotates clockwise causing the left mirror 555 to move the left laser line 513 outward. This causes the distance between the left laser line 513 and right laser line 517 to increase. Both the right laser line 517 and left laser line 513 move in equal distance from each other. In addition, both the right mirror 557 and left mirror 555 move in opposite, but corresponding, angles of each other.

In an additional embodiment, the set of two mirrors 555, 557 remain stationary, while the beam splitter 559 is moved away from and toward the single laser 507. This beam splitter 559 moves accordingly by turning a knurled knob 512 connected to a gear mechanism. As described above, a single laser line 509 is projected through a beam splitter 559 that splits the single laser line 509 into three laser lines: a left laser line 513, a right laser line 517, and a center laser line 515. The single laser line 509 is split so that the left and right laser lines 513, 517 are perpendicular to the third center laser line 515. A set of two mirrors 555, 557 are used to reflect left laser line 513 and right laser line 517 so that the right laser line 517 and left laser line 513 are projected in the same direction as the center laser line 515. The distance between the left laser line 513 and the center laser line 515 is equal to the distance between the right laser line 517 and the center laser line 515. Therefore, the center laser line 515 is always the exact center point between the left laser line 513 and right laser line 517.

The left mirror 555 is positioned to the left of the beam splitter 559. The right mirror 557 is positioned to the right of the beam splitter 559. The mirrors 555, 557 are aligned across each other, and are positioned in opposite angles of each other. The mirrors 555, 557 remain stationary.

In an alternative embodiment, both the set of mirrors 555, 557 may rotate and the beam splitter 559 may move away and toward the single laser 501 to provide for greater range of motion and flexibility in moving the laser lines 513, 517.

In order to move the left laser line 513 and right laser line 517 in identical relation to each other, the beam splitter 559 is moved toward and away from the center laser 507. As the beam splitter 559 is moved toward and away from the center laser 507, the left laser line 513 and right laser line 517 reflect off different portions of the stationary mirrors 557, 557 causing the lasers to reflect off the mirror at various angles.

The beam splitter 559 is connected to a gear mechanism comprised of knurled knob 512 secured to a main gear drive 504 that connects to a linear gear 508. The linear gear is attached to a column 533 that is connected to the beam splitter 559. The knurled knob 512 rotates the main gear drive 504 which in turn causes the linear gear 512, the column 533, and the beam splitter 559 to move away from or towards the single laser 507.

By way of example, as the beam splitter 559 is moved away from the center laser 507, left laser line 513 and right laser line 517 reflect off the bottom portions of the mirrors 555, 557 causing the distance between the left laser line 513 and right laser line 517 to increase. The left laser line 513 and right laser line 517 move in identical relation to each other.

The present invention can also be used as a separate attachment. The beam splitter 559 together with the mirror system 555, 551, 557, 553 may be attached to any commercial laser. In the alternative, the beam splitter 559 may comprise multiple beam splitters or a prism or multiple prisms.

As depicted in FIGS. 6A and 6B, an additional embodiment of the present invention provides for a single laser 607, at least one beam splitter or prism 659, and a shaded lens 663 with a small opening 667. The single laser 607 projects a single laser line 615 through a prism or beam splitter 659 which splits the beam into a full parabolic shape. Within the prism or beam splitter 659 is a hash mark 669 that indicates the center of the parabolic shape. A lens 663 with a small opening 667 is placed in front of the prism or beam splitter 659 so that it blocks the full parabolic shape from being projected on a surface but for a small opening 667 in the center of the lens 663. The small opening 667 in the center of the shaded lens 663 allows for a horizontal laser line 665 with the center hash mark 669 to be projected against a surface. The lens 663 may be one or more lenses placed together to provide or form the hash mark. The prism or beam splitter 659 and single laser 607 remain stationary.

The shaded lens 663 moves away from and towards the prism 659 and single laser 607 by turning a knurled knob 612 connected to a gear mechanism. The gear mechanism is comprised of a knurled knob 612 secured to a main gear drive 604 that connects to a linear gear 608. The linear gear is attached to a column 633 that is connected to the shaded lens 663. The knurled knob 612 rotates the main gear drive 604 which in turn causes the linear gear 612, the column 633, and the shaded lens 663 to move away from or towards the prism 659 and single laser 607.

As the shaded lens 663 moves toward the prism or beam splitter 659, the horizontal line 665 increases in size. As the lens 663 moves away from the prism or beam splitter 659, the horizontal line 665 decreases in size. Because the hash mark 669 remains stationary, a user can easily find the center of the horizontal line 665. By way of example, as the prism moves toward the single laser, the center hash mark remains stationary and the distance between the left and right hash mark increases. As the prism moves away from the single laser, the center hash mark remains stationary and the distance between the left and right hash mark decreases.

In an alternative to the gear mechanism, other drive mechanisms may be used to rotate the lasers, mirrors, shades, beam splitter, and prism. Such other drive systems may include belts, chains, wires, or pulleys.

An alternative interaction with the parabolic laser line includes an upside-down "V" or triangle shaped shade. The shade is designed such that only the portion of the laser line that shines through the upside-down cutout "V" is projected on the surface or wall. The upside-down cutout "V" shape shade is raised and lowered in front of the parabolic laser line. As the upside-down cutout "V" shape shade is raised upward, a larger portion of the parabolic laser line shines through the upside-down cutout "V" shaped shade and thus, the parabolic laser line projected on the surface increases in width. Similarly, as the upside-down cutout "V" shape shade is lowered, a smaller portion of the parabolic laser line shines through the upside down cutout "V" shaped shade, and thus, the parabolic laser line decreases in width.

In an additional embodiment (depicted in FIGS. 8 and 9), the present invention comprises a main housing 801, a single laser 814, a shading mechanism 830 (seen in FIG. 8), shades 810, 818, a knurled knob 812, and guide or raceway 818, 820 for the shades 810, 818. The single laser 814 projects a horizontal laser line against a surface. The single laser 801 may have the ability to be powered by battery, an alternating current ("AC") transformer, or an AC adapter for extended use.

The center of the projected horizontal laser line may be indicated by a hash mark, center notch, or accented center point. This center mark may be created by either an amplified or concentrated laser projection. As the shades 810, 818 open and close the width of the horizontal laser line increases and decreases. The left shade 810 and right shade 818 move in identical relation to each other so that the center mark always indicates the center of the horizontal laser line.

Figure 8:
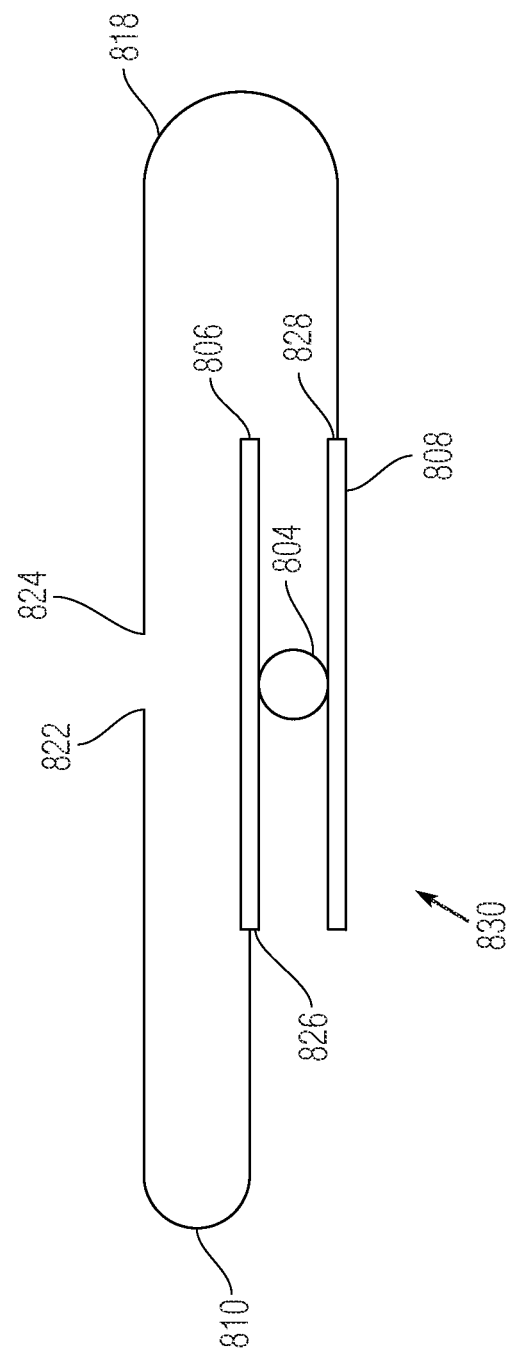
FIG. 8 illustrates the shading mechanism of the present invention.

FIG. 8 depicts a top view of the shading mechanism 830. The shading mechanism 830 comprises a left shade 810 having a first end 822 and second end 826, a right shade 818 having a first end 824 and second end 828, a first linear gear 806, a second linear gear 808, and a main gear drive 804. The second end 826 of the left shade 810 is connected to the first linear gear 806. The second end 828 of the right shade 818 is connected to the second linear gear 808. A main gear drive 804 is positioned between the first linear gear 806 and the second linear gear 808.

In an alternative embodiment, the second end 826, 828 of the left and right shades 810, 818 may be integrated with the first and second linear gears 806, 808 such that either a section of the shades 810, 818 is integrated with or fastened to the linear gears 806, 808 or the entire shade 810, 818 is integrated with the linear gears 806, 808.

The left shade 810 is curved to the right and right shade 818 is curved to the left such that the first ends 822, 824 of the left and right shades 810, 818 are aligned. As the main gear drive 804 is rotated the first linear gear 806 and second linear gear 808 move in opposite directions causing the shades 810, 818, or more specifically, the shade first ends 822, 824 to move towards each other or away from each other. For example, as the main gear drive 804 is rotated counterclockwise, the first linear gear 806 moves to the left and the second linear gear 808 moves to the right in concert causing the first ends 822, 824 of the shades 810, 818 to meet in an identical relation to each other. Conversely, as the main gear drive 804 is rotated clockwise, the first linear gear 806 moves to the right and the second linear gear 808 moves to the left in concert causing the first ends 822, 824 of the shades 810, 818 to move away from each other in an identical relation to each other. Thus, by moving the main gear drive 804, the shade first ends 822, 824 open and close to make the projected laser line bigger or smaller.

The single laser 814 (see FIGS. 9A and 9B) projects a laser line between the first ends 822, 824 of the left and right shades 810, 818. Thus, as the shades 810, 818 close, it blocks the right and left side of the horizontal laser line causing a decrease in the width of the horizontal laser line. Similarly, as the shades 810, 818 open the width of the horizontal laser line increases. This allows for the user to adjust the width of the horizontal laser line to equal the space to be centered. The shades 810, 818 may be made of flexible material to allow it to curve around the single laser 814 and flexibly move back and forth in the main housing 801. The integration of the shading mechanism 830 and main housing 801 is described further in FIG. 9A.

Figure 9A:
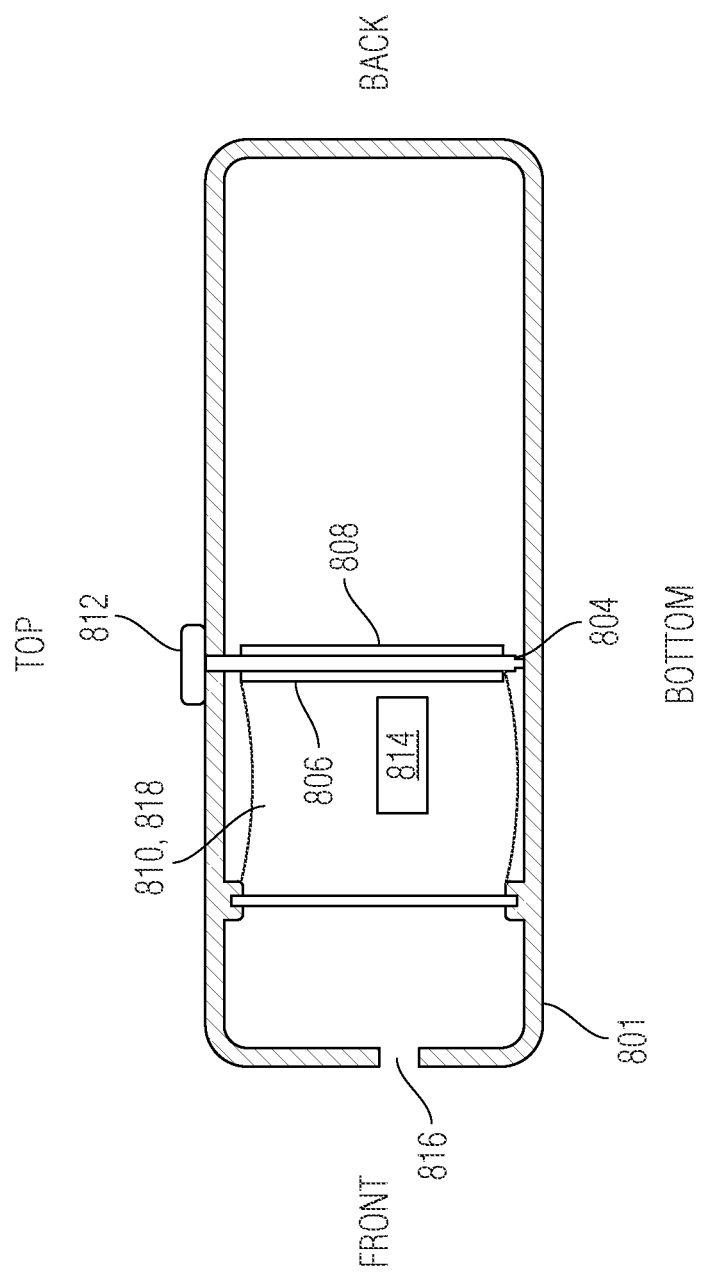
FIG. 9A illustrates the present invention including a shade mechanism, a single laser, a housing, and flexible shades.

FIG. 9A illustrates a cross sectional and internal view of the main housing 801 and shading mechanism 830. The main gear drive 804 is located inside the main housing 801, and is positioned between the first linear gear 806 and second linear gear 808. The left shade 810 is connected to the first linear gear 806, and the right shade 818 is connected to the second linear gear 808. A knurled knob 812 is connected to the main gear drive 804 and positioned on top of the main housing 801. The knurled knob 812 rotates the main gear drive 804 and allows for fine adjustments of the shades 810, 818. A top and bottom guide or raceway 818, 820 are positioned inside the main housing 801. The guide or raceway 818, 820 secures and acts as a guide for the shades 810, 818 such that the shades 810, 818 may slide back and forth within the guide or raceway 818, 820 as the main gear drive 804 is rotated. A single laser 814 is positioned between the main gear drive 804 and the shades 810, 818. The single laser 814 projects a horizontal laser line out the housing opening 816 in the main housing 801.

The shades 810, 818 block portions of the laser line from projecting through the laser opening 816. As an example, a user wants to determine the center of his wall and uses the present invention to project a horizontal laser line against his wall. The user rotates the knurled knob 812 counterclockwise causing the main gear drive 804 to move the first ends 822, 824 of the left shade 810 and right shade 818 closer together. As the first ends 822, 824 of the shades 810, 818 move closer together, portions of the projected horizontal laser line are blocked and the width of the horizontal laser line decreases. The user continues to rotate the knurled knob 812 counterclockwise until the width of the horizontal laser line is equal to the surface to be centered. The center mark on the horizontal laser line indicates the center of the surface.

Figure 9B:
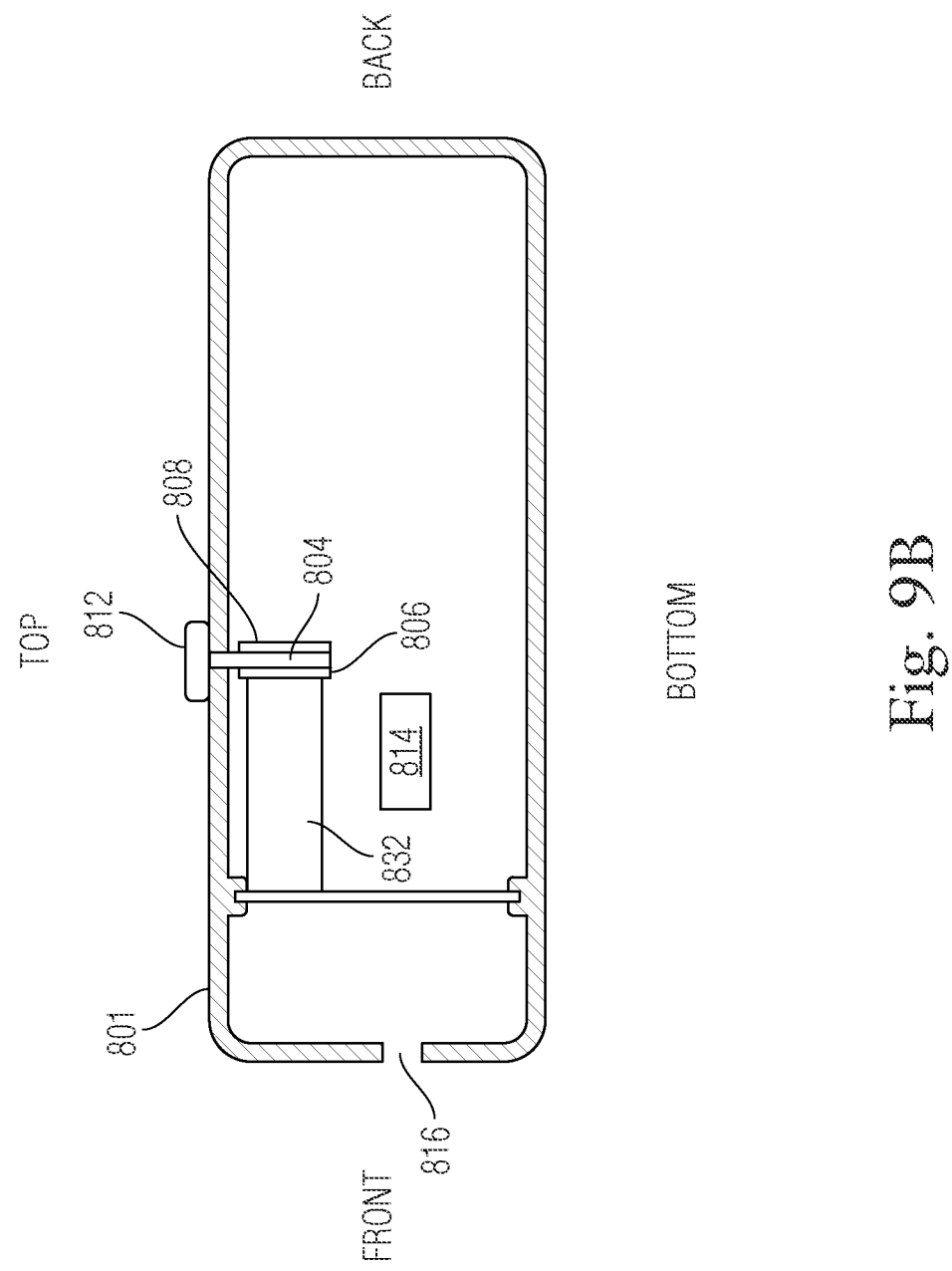
FIG. 9B illustrates the present invention including a shade mechanism, a single laser, a housing, and "T" shaped shades.

An additional embodiment of the shade design is depicted in FIG. 9B. In the additional embodiment, the shades 810, 818 are not curved, but are straight with a second connecting piece or stem 832 forming a "T" shape. The stem 832 of each shade is connected to the appropriate linear gear 806, 808. The linear gears 806, 808, center gear 804, and stems 832 are designed such that their vertical height is limited allowing placement of the laser 814 anywhere in the housing 801 including below or behind the gearing mechanism. The shades 810, 818 are designed to lie in the path of the laser line output to shade the line but for the opening between the shades. The adjustment of the laser line width is the same as that described in FIG. 9A, such that a user may rotate the knurl knob 812 for the fine adjustments of the shades 810, 818. As the knurl knob 812 is rotated counterclockwise, the main gear drive 804 moves the left shade 810 and right shade 818 closer together causing the shades 810, 818 to close. Conversely, as the knurl knob 812 is rotated clockwise, the main gear drive 804 moves left shade 810 and right shade 818 farther apart causing the shades 810, 818 to open. The gearing mechanism could be modified to work in the opposite direction or to have a different design but still fit within the scope of the present invention.

As an alternative to the use of gears in the shading mechanism 830 described above, the shading mechanism 830 may be designed with a tension drive. Tension is used to close the shades 810, 818 (i.e., the first ends 822, 824 of the shades 810, 818 meet and block the laser from being projected onto a surface). A knurl knob 812 may be used to widen the distance between the shades 810, 818. As described above, the width of the horizontal laser line increases as the distance between the shades 810, 818 increase. The shades 810, 818 move concurrently and in an identical relation to each other such that the center mark indicates the center of the projected horizontal laser line. A lock or anchor mechanism holds the shades 810, 818 in place. Such lock or anchor mechanism may be either a frictional press or a screw tension. The main housing 801 may also be designed with a rough surface to create greater friction for either the frictional press or screw tension locking mechanism. In an alternative design, the locking mechanism may consist of a spring and rubber pad such that when the locking mechanism is depressed, friction locks the knurl knob 812 and shades 810, 818 from moving.

In addition, the tension drive may also include negative tension. Such negative tension may be created by an additional rotational spring. The negative tension would offset the tension used to pull the shades 810, 818 together. This would allow a user to increase the width between the shades 810, 818 more easily.

The examples provided herein are merely for the purpose of explanation and are in no way to be construed as limiting of the present method and product disclosed herein. While the invention has been described with reference to various embodiments, it is understood that the words which have been used herein are words of description and illustration, rather than words of limitation. Further, although the invention has been described herein with reference to particular means, materials, and embodiments, the invention is not intended to be limited to the particulars disclosed herein; rather, the invention expands to all functionally equivalent structures, methods and uses, such as are within the scope of the appended claims. Those skilled in the art, having the benefit of the teachings of this specification, may affect numerous modifications thereto and changes may be made without departing from the scope and spirit of the invention.

It will be recognized by those skilled in the art that changes or modifications may be made to the above described embodiment without departing from the broad inventive concepts of the invention. It is understood therefore that the invention is not limited to the particular embodiment which is described, but is intended to cover all modifications and changes within the scope and spirit of the invention.

What is claimed is:

1. A device comprising:
   a housing;
   a center light source mated to the housing configured to generate a center reference light line projected onto a surface;
   a left light source configured to generate a left reference light line projected onto the surface wherein the left light source is connected to a left rotational element;
   a right light source configured to generate a right reference light line projected onto the surface wherein the right light source is connected to a right rotational element;
   a power source for providing power to the center light source, left light source, and right light source;
   a gear system within the housing which controls the rotation of the left rotation element and right rotational element configured to move the left rotational element and right rotational element in unison and in opposite rotational directions; and
   wherein the movement of the left rotational element and right rotational element cause the left reference light line and the right reference light line to move in equal increments away from or towards the center reference light line.

2. The device of claim 1, wherein the device further includes a sensor for receiving a reflected light signal from the center light source, wherein the reflected light signal can be used to determine the distance from the device to the reflecting surface.

3. The device of claim 2, wherein the determined distance can be used in combination with the degree of rotation of at least one of the rotational elements to determine the distance between the center reference light line and the left reference light line or the right reference light line.

4. The device of claim 3 further including a display for displaying one or more determined distances.

5. The device of claim 1, wherein the device further includes a left sensor for receiving a reflected light signal from the left light source and a right sensor for receiving a reflected light signal from the right light source, wherein the left and right reflected light signals can be used to determine a left side distance and a right side distance of the respective light from the reflecting surface.

6. The device of claim 5, wherein the system can notify the user when the left side distance and right side distance are equal indicative of the device being parallel to the surface.

7. The device of claim 1, wherein the device has a mounting element for mounting to a stand.

8. The device of claim 1, wherein the device further includes an adjustment dial for the user to adjust the angular rotation of the left rotational plate and right rotational plate.

9. A device comprising:
   a housing;
   a center light source mated to the housing configured to generate a center light beam;
   a power source for providing power to the center light source;
   at least one beam splitter for splitting the center light source into a center beam, a left beam and a right beam, wherein the center beam projects a center reference light line onto a surface;
   a left mirror configured to reflect the left beam producing a left reference light line on the surface wherein the left mirror is connected to a left rotational element;
   a right mirror configured to reflect the right beam producing a right reference light line on the surface wherein the right mirror is connected to a right rotational element;
   a gear system within the housing which controls the rotation of the left rotation element and right rotational element and is configured to move the left rotational element and right rotational element in unison and in opposite rotational directions; and
   wherein the movement of the left rotational element and right rotational element cause the left reference light line and the right reference light line to move in equal increments away from or towards the center reference light line.

10. The device of claim 9, wherein the device further includes a sensor for receiving a reflected light signal from the center light source, wherein the reflected light signal can be used to determine the distance from the device to the reflecting surface.

11. The device of claim 10, wherein the determined distance can be used in combination with the degree of rotation of at least one of the rotational elements to determine the distance between the center reference light line and the left reference light line or right reference light line.

12. The device of claim 11 further including a display for displaying one or more determined distances.

13. The device of claim 9, wherein the device further includes a left sensor for receiving a reflected light signal from the left beam and a right sensor for receiving a reflected light signal from the right beam, wherein the left and right reflected light signals can be used to determine a left side distance and a right side distance of the respective light from the reflecting surface.

14. The device of claim 13, wherein the system can notify the user when the left side distance and right side distance are equal indicative of the device being parallel to the surface.

15. The device of claim 9, wherein the device has a mounting element for mounting to a stand.

16. The device of claim 9, wherein the device further includes an adjustment dial for the user to adjust the angular rotation of the left rotational plate and right rotational plate.

17. A device comprising:
    a housing;

a center light source mated to the housing configured to generate a center light beam;

a power source for providing power to the center light source;

at least one beam splitter for splitting the center light source into a center beam, a left beam and a right beam, wherein at least one of the at least one beam splitter is mounted to a moveable plate and wherein the center beam projects a center reference light line onto a surface;

a left mirror configured to reflect the left beam producing a left reference light line on the surface;

a right mirror configured to reflect the right beam producing a right reference light line on the surface;

a mechanism within the housing which controls the movement of the moveable plate so that the left beam and right beam reflect off of the left mirror and right mirror respectively at different locations on the mirrors; and wherein the movement of the moveable plate causes the left reference light line and the right reference light line to move in equal increments away from or towards the center reference light line.

18. The device of claim 17, wherein the device further includes a sensor for receiving a reflected light signal from the center light source, wherein the reflected light signal can be used to determine the distance from the device to the reflecting surface.

19. The device of claim 18, wherein the determined distance can be used in combination with the displacement of the moveable plate to determine the distance between the center reference light line and the left reference light line or right reference light line.

20. The device of claim 19 further including a display for displaying one or more determined distances.

21. The device of claim 17, wherein the device further includes a left sensor for receiving a reflected light signal from the left beam and a right sensor for receiving a reflected light signal from the right beam, wherein the left and right reflected light signals can be used to determine a left side distance and a right side distance of the respective light from the reflecting surface.

22. The device of claim 21, wherein the system can notify the user when the left side distance and right side distance are equal indicative of the device being parallel to the surface.

23. The device of claim 17, wherein the device has a mounting element for mounting to a stand.

24. The device of claim 17, wherein the device further includes an adjustment dial for the user to adjust the movement of the moveable plate.

* * * * *